US012720388B2

(12) United States Patent
Luo et al.

(10) Patent No.: US 12,720,388 B2
(45) Date of Patent: Aug. 25, 2026

(54) CELL HANDOVER METHOD AND APPARATUS, AND USER EQUIPMENT

(71) Applicant: VIVO MOBILE COMMUNICATION CO., LTD., Dongguan (CN)

(72) Inventors: Jiawei Luo, Dongguan (CN); Jinning Huang, Dongguan (CN); Yi He, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 532 days.

(21) Appl. No.: 18/215,893

(22) Filed: Jun. 29, 2023

(65) Prior Publication Data

US 2023/0345327 A1 Oct. 26, 2023

Related U.S. Application Data

(63) Continuation of application No. PCT/CN2021/141626, filed on Dec. 27, 2021.

(30) Foreign Application Priority Data

Dec. 31, 2020 (CN) ........................ 202011626410.9

(51) Int. Cl.
*H04W 36/08* (2009.01)
*H04W 36/30* (2009.01)

(52) U.S. Cl.
CPC ......... *H04W 36/08* (2013.01); *H04W 36/304* (2023.05)

(58) Field of Classification Search
CPC ... H04W 36/08; H04W 36/304; H04W 36/36; H04W 36/0011; H04W 36/30
See application file for complete search history.

(56) References Cited

U.S. PATENT DOCUMENTS

2013/0035101 A1* 2/2013 Wang ................ H04W 36/0007 455/437
2014/0113630 A1 4/2014 Vangala et al.
(Continued)

FOREIGN PATENT DOCUMENTS

CN 101888663 A 11/2010
CN 102572887 A 7/2012
(Continued)

OTHER PUBLICATIONS

Extended European Search Report issued in related European Application No. 21914256.9, mailed Apr. 9, 2024, 10 pages.
(Continued)

*Primary Examiner* — Ricky Q Ngo
*Assistant Examiner* — Kabir U Jahangir
(74) *Attorney, Agent, or Firm* — IPX PLLC

(57) ABSTRACT

A cell handover method and apparatus, and user equipment are provided. The method includes: when User Equipment (UE) camps on a first cell, obtaining first information, where the first information is used to indicate an abnormal situation when the UE uses a data network corresponding to the first cell; and when the first information meets a first preset condition, handing over from the first cell to a second cell, where the second cell is a cell whose signal quality parameter meets a second preset condition, or the second cell is a cell with the highest access priority; where the first information includes at least one of the following: information about a target data packet, network-related information corresponding to at least one application, a target uplink resource, a data accumulation amount at a data link layer, and a channel quality parameter of the first cell.

15 Claims, 3 Drawing Sheets

When UE camps on a first cell, the UE obtains first information — 201

When the first information meets a first preset condition, the UE hands over from the first cell to a second cell — 202

(56) References Cited

U.S. PATENT DOCUMENTS

| | | | | |
|---|---|---|---|---|
| 2016/0119850 | A1* | 4/2016 | Kimura | H04W 16/28 370/332 |
| 2016/0135071 | A1 | 5/2016 | Davydov et al. | |
| 2018/0206169 | A1 | 7/2018 | Liu | |
| 2019/0274076 | A1* | 9/2019 | Kim | H04W 24/10 |
| 2020/0053607 | A1* | 2/2020 | Ingale | H04W 36/304 |
| 2020/0162962 | A1* | 5/2020 | Li | H04W 28/0236 |

FOREIGN PATENT DOCUMENTS

| | | | |
|---|---|---|---|
| CN | 103096356 | A | 5/2013 |
| CN | 110099421 | A | 8/2019 |
| CN | 110267319 | A | 9/2019 |
| CN | 110868746 | A | 3/2020 |
| CN | 110913455 | A | 3/2020 |
| CN | 111447107 | A | 7/2020 |
| CN | 111526529 | A | 8/2020 |
| CN | 111601349 | A | 8/2020 |
| CN | 111770540 | A | 10/2020 |
| CN | 111918348 | A | 11/2020 |
| CN | 112738856 | A | 4/2021 |
| IN | 107770768 | A | 3/2018 |
| KR | 950022263 | A | 7/1995 |
| WO | 2016090842 | A1 | 6/2016 |
| WO | 2016184141 | A1 | 11/2016 |

OTHER PUBLICATIONS

Decision of Reexamination issued in related Chinese Application No. 202011626410.9, mailed May 20, 2024, 1 pages.

Search Report issued in related Chinese Application No. 202011626410.9, mailed Jun. 17, 2024, 3 pages.

International Search Report issued in corresponding International Application No. PCT/CN2021/141626, mailed Mar. 28, 2022, 5 pages.

First Office Action issued in related Chinese Application No. 202011626410.9, mailed Dec. 5, 2022, 4 pages.

Second Office Action issued in related Chinese Application No. 202011626410.9, mailed May 10, 2023, 7 pages.

* cited by examiner

CELL HANDOVER METHOD AND APPARATUS, AND USER EQUIPMENT

CROSS-REFERENCE TO RELATED APPLICATIONS

This application is a continuation of International Application No. PCT/CN2021/141626, filed on Dec. 27, 2021, which claims priority to Chinese Patent Application No. 202011626410.9, filed on Dec. 31, 2020, The entire contents of each of the above-identified applications are expressly incorporated herein by reference.

TECHNICAL FIELD

This application belongs to the field of communication technologies, and specifically relates to a cell handover method and apparatus, and user equipment.

BACKGROUND

In an actual network scenario, User Equipment (UE) often fails to access the Internet due to cell congestion, cell abnormality, and abnormal network resource allocation. In a communication system, when the UE is in a connected state, a network device usually can obtain a load condition of an entire network, and the network device can trigger the UE to perform cell handover according to the load condition of the network to realize load balance of the network.

However, in the foregoing method, because the network device assigns a new cell to the UE according to the load condition of the network, so that the UE performs cell handover, and the new cell still may have cell congestion and cell abnormality, the UE cannot access the cell. Consequently, a network service of the UE is interrupted.

SUMMARY

A purpose of embodiments of this application is to provide a cell handover method and apparatus, and user equipment.

According to a first aspect, an embodiment of this application provides a cell handover method, where the cell handover method includes: when UE camps on a first cell, obtaining first information, where the first information is used to indicate an abnormal situation when the UE uses a data network corresponding to the first cell; and when the first information meets a first preset condition, handing over from the first cell to a second cell, where the second cell is a cell whose signal quality parameter meets a second preset condition, or the second cell is a cell with the highest access priority; where the first information includes at least one of the following: information about a target data packet, network-related information corresponding to at least one application, a target uplink resource, a data accumulation amount at a data link layer, and a channel quality parameter of the first cell.

According to a second aspect, an embodiment of this application provides a cell handover apparatus, where the cell handover apparatus includes: an obtaining module and a handover module; where the obtaining module is configured to: when UE camps on a first cell, obtain first information, where the first information is used to indicate an abnormal situation when the UE uses a data network corresponding to the first cell; and the handover module is configured to: when the first information meets a first preset condition, hand over from the first cell to a second cell, where the second cell is a cell whose signal quality parameter meets a second preset condition, or the second cell is a cell with the highest access priority; where the first information includes at least one of the following: information about a target data packet, network-related information corresponding to at least one application, a target uplink resource, a data accumulation amount at a data link layer, and a channel quality parameter of the first cell.

According to a third aspect, an embodiment of the present application provides UE, where the UE includes a processor, a memory, and a program or instructions that is or are stored in the memory and capable of running on the processor, and when the program or the instructions is or are executed by the processor, the steps of the file sending method according to the first aspect are implemented.

According to a fourth aspect, an embodiment of this application provides a readable storage medium, where the readable storage medium stores a program or instructions, and when the program or the instructions is or are executed by a processor, the steps of the file sending method according to the first aspect are implemented.

According to a fifth aspect, an embodiment of this application provides a chip, where the chip includes a processor and a communication interface, the communication interface is coupled to the processor, and the processor is configured to run a program or instructions to implement the file sending method according to the first aspect.

In the embodiments of this application, when the UE uses the data network corresponding to the first cell, the UE can obtain the first information (that is, the information about the target data packet, the network-related information corresponding to the at least one application, the target uplink resource, the data accumulation amount at the data link layer, and/or the channel quality parameter of the first cell) to determine, according to the first information, whether the network is abnormal when the UE uses the data network corresponding to the first cell, and when determining that the network is abnormal, the UE can hand over from the first cell to the cell whose signal quality parameter meets the second preset condition, or the cell with the highest access priority.

DETAILED DESCRIPTION

The following describes the embodiments of this application with reference to the accompanying drawings in the embodiments of this application. Apparently, the described embodiments are some but not all of the embodiments of this application. AU other embodiments obtained by a person of ordinary skill in the art based on the embodiments of this application without making creative efforts shall fall within the protection scope of this application.

In the specification and claims of this application, the terms "first" and "second" are used to distinguish between similar objects, but are unnecessarily used to describe a specific sequence or order. It should be understood that terms used in such a way are exchangeable in a proper case, so that the embodiments of this application described herein can be implemented in an order other than the order shown or described herein. In addition, objects distinguished by "first," "second," and the like are generally of one type, and a number of objects is not limited. For example, there may be one or more first objects. In addition, "and/or" in this specification and the claims represents at least one of the connected objects, and the character "/" generally represents an "or" relationship between the associated objects.

With reference to the accompanying drawings, the following describes, by using a specific embodiment and an application scenario thereof, in detail a cell handover method provided in embodiments of this application.

In the embodiments of this application, when cell congestion, cell abnormality, or abnormal network allocation resources cause that the UE cannot access the Internet, the UE cannot access the Internet normally (for example, a web page cannot be opened normally) when camping on these cells. In this case, the UE can detect a proper cell through this solution, and hands over to the proper cell to realize normal Internet access. In the embodiments of this application, the UE can determine whether a data network of the UE is normal at present by using information such as a current uplink network speed, a downlink network speed, whether handshake times out, whether domain name resolution times out, and the like, and trigger a radio link failure when determining that the data network is abnormal, so that the UE performs cell reselection, thereby camping on a better cell.

It should be noted that, when the UE is in a service connected state and maintains a service, the UE moves from one cell to another cell, and an original serving cell does not continue to provide a service for the UE. In order not to interrupt the service, a radio bearer system will search for a most suitable cell or network to provide a continuous service for the UE, so as to implement mobility management of seamless coverage of a radio network. This is cell handover.

Figure 1:
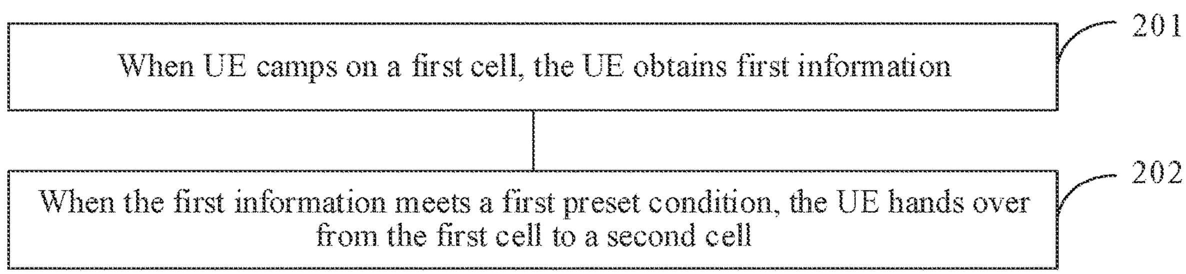
FIG. 1 is a schematic diagram 1 of a cell handover method according to an embodiment of this application.

An embodiment of this application provides a cell handover method. FIG. 1 is a flowchart of a cell handover method according to an embodiment of this application. The method may be applied to UE. As shown in FIG. 1, the cell handover method provided in this embodiment of this application may include the following steps 201 and 202.

Step 201: When the HE camps on a first cell, the UE obtains first information.

In this embodiment of this application, the first information is used to indicate an abnormal situation when the HE uses a data network corresponding to the first cell.

In this embodiment of this application, the UE currently camps on the first cell. When the UE uses the data network (for example, performs data transmission) corresponding to the first cell, the UE may obtain the first information to determine whether a network status of the UE is abnormal when the UE uses the data network corresponding to the first cell, for example, a network is slow or a network rate is low (for example, the network rate is less than a threshold).

In this embodiment of this application, the first information includes at least one of the following: information about a target data packet, network-related information corresponding to at least one application, a target uplink resource, a data accumulation amount at a data link layer, and a channel quality parameter of the first cell.

In this embodiment of this application, the target data packet is a data packet transmitted by the UE by using the data network corresponding to the first cell, the at least one application is an application run by the UE by using the data network corresponding to the first cell, and the target uplink resource is an uplink resource allocated by a network device corresponding to the first cell to the UE.

In this embodiment of this application, the target data packet includes at least one of the following: an uplink data packet and a downlink data packet; and the information about the target data packet includes at least one of the following: a number of target data packets and type information of a data packet in the target data packet.

In this embodiment of this application, the UE may obtain information (that is, number and type information) about an uplink data packet and a number of downlink data packets that are transmitted by the UE by using the data network corresponding to the first cell within first preset duration.

In this embodiment of this application, the type information may be used to indicate at least one of the following: a Transmission Control Protocol (TCP) type, an Internet Protocol (IP) type, a User Datagram Protocol (UDP) type, and the like.

In this embodiment of this application, the above-mentioned network-related information includes at least one of the following: domain name resolution information, TCP handshake information, and a network rate, where the domain name resolution information is used to indicate a domain name resolution situation of the at least one application, the TCP handshake information is used to indicate a TCP handshake situation of the at least one application, and the network rate is a maximum network rate corresponding to the at least one application.

It should be noted that, domain name resolution is used to represent whether domain name resolution of the at least one application times out; TCP handshake is used to represent whether the TCP handshake of the at least one application times out; and the network rate may include at least one of the following: an uplink network rate (i.e., an uplink data transmission rate) and a downlink network rate (i.e., a downlink data transmission rate).

In this embodiment of this application, the data link layer may be a Media Access Control (MAC) layer, and the data accumulation amount of the MAC layer may be understood as a data buffer amount of the MAC layer (MAC buffer).

In this embodiment of this application, the UE may obtain, by using a modem end, an uplink resource (such as an UpLink scheduling grant OM grant)) and the data accumulation amount of the MAC layer that are allocated to the UE by the network device within third preset duration; and/or the UE may obtain the channel quality parameter of the first cell within fourth preset duration by using the modem end.

In this embodiment of this application, the channel quality parameter includes at least one of the following: a first ratio, a second ratio, a third ratio, and a number of Resource Blocks (RB) scheduled by a Physical Uplink Shared CHannel (PUSCH). The first ratio is a proportion (that is, NACK_rate) of Negative ACKnowledgement (NACK) information on a Physical Hybrid automatic repeat request Indicator CHannel (PHICH), the second ratio is a retransmission rate (that is, UL retransmission_rate) of uplink data, and the third ratio is a proportion (that is, PDSCH NACK_rate) of NACK information on a Physical Downlink Shared CHannel (PDSCH).

Step 202: When the first information meets a first preset condition, the UE hands over from the first cell to a second cell.

In this embodiment of this application, the second cell is a cell whose signal quality parameter meets a second preset condition, or the second cell is a cell with the highest access priority.

It may be understood that, in this embodiment of this application, the UE may hand over from the first cell to the second cell according to the obtained first information, that is, whether the UE has network abnormality when the UE uses the data network corresponding to the first cell, to determine whether cell handover is to be performed, so that the UE can access a proper cell to perform a network service when the UE has network abnormality (that is, the first information meets the first preset condition). In addition, in this case, the cell on which the UE currently camps is the second cell, and the UE continues to obtain information (that is, used to indicate abnormality when the UE uses the data network corresponding to the second cell) when the UE camps on the second cell, so as to continue to determine, according to whether the information meets the first preset condition, whether to perform cell handover, and so on, until the information obtained in the cell on which the UE camps does not meet the first preset condition, so that the UE performs the network service by using the data network corresponding to the cell.

In this embodiment of this application, when the first information meets the first preset condition, the UE may directly initiate an access request to a cell whose signal quality parameter meets the second preset condition, so as to successfully access the cell.

In this embodiment of this application, when the first information meets the first preset condition, the UE may first trigger a current radio link failure, perform a network re-search, and then after completing the network search, preferentially a cell with the highest access priority. (because the priority of the first cell is reduced, in an environment covered by multiple cells, a cell with the highest access priority is selected from the multiple cells for camping).

In this embodiment of this application, the UE may implement cell handover by using a modem end, for example, the modem end receives a network restoration command sent by an Android terminal, so as to hand over from the first cell to the second cell to implement normal Internet access.

In this embodiment of this application, the signal quality parameter may include at least one of the following: Reference Signal Received Power (RSRP) and Reference Signal Received. Quality (RSRQ); and the second cell may be a cell that is in a neighboring cell of the first cell and whose signal quality parameter meets the second preset condition.

In this embodiment of this application, the cell whose signal quality parameter meets the second preset condition includes at least one of the following: a cell with largest RSRP in the neighboring cell of the first cell, and a cell with largest RSRQ in the neighboring cell of the first cell.

In this embodiment of this application, the UE stores identities of multiple cells in a sequence of access priorities of the multiple cells; and when determining that the first information meets the first preset condition, the UE may select a first identity from the identities of the multiple cells to access a cell indicated by the first identity.

In this embodiment of this application, the first preset condition includes at least one of the following:

within first preset duration, a number of uplink data packets is greater than or equal to a first threshold, a number of downlink data packets is less than or equal to a second threshold, and the uplink data packet includes a TCP data packet;

within second preset duration, multiple applications in the at least one application have a domain name resolution timeout or a TCP handshake timeout, and a maximum network rate corresponding to the multiple applications is less than or equal to a third threshold;

within third preset duration, the target uplink resource is less than or equal to a fourth threshold, and the data accumulation amount is greater than or equal to a fifth threshold; and within fourth preset duration, the channel quality parameter of the first cell meets a third preset condition.

In this embodiment of this application, that the maximum network rate corresponding to the multiple applications is less than or equal to a third threshold may include at least one of the following: The maximum uplink network rate corresponding to the multiple applications is less than or equal to a preset threshold, and the maximum downlink network rate corresponding to the multiple applications is less than or equal to a preset threshold.

In this embodiment of this application, that the channel quality parameter of the first cell meets a third preset condition may include at least one of the following: The first ratio (that is, PHICH NACK_rate) is greater than or equal to a preset threshold, the second ratio (that is, UL retransmission_rate) is greater than or equal to a preset threshold, the third ratio (that is, PDSCH NACK_rate) is greater than or equal to a preset threshold, and the number of RBs scheduled by the PUSCH is less than or equal to a preset threshold.

Figure 2:
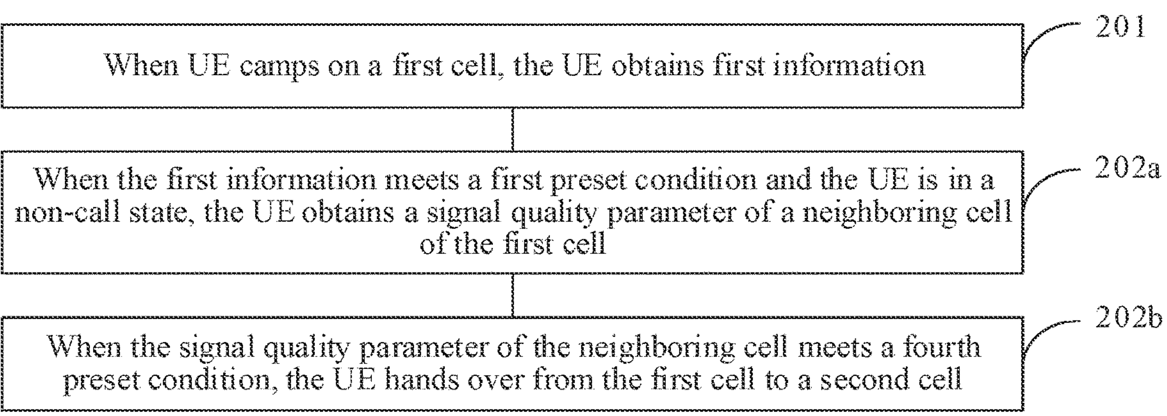
FIG. 2 is a schematic diagram 2 of a cell handover method according to an embodiment of this application.

In this embodiment of this application, with reference to FIG. 1, as shown in FIG. 2, step 202 may be specifically implemented by using the following step 202*a* and step 202*b*.

Step 202*a*: When the first information meets the first preset condition and the UE is in a non-call state, the UE obtains a signal quality parameter of a neighboring cell of the first cell.

In this embodiment of this application, when determining that the first information meets the first preset condition, the UE may determine whether the UE is currently in a call state, and when the UE is in a non-call state, detect whether a neighboring cell exists in the first cell, so as to obtain a signal quality parameter (RSRP and/or RSRQ) of the neighboring cell when the neighboring cell exists in the first cell, so as to determine, according to the signal quality parameter, whether to perform cell handover.

Step 202*b*: When the signal quality parameter of the neighboring cell meets a fourth preset condition, the UE hands over from the first cell to the second cell.

In this embodiment of this application, that the signal quality parameter meets a fourth preset condition may include at least one of the following: The RSRP is greater than or equal to a preset threshold, and the RSRQ is greater than or equal to a preset threshold.

In this embodiment of this application, the UE may accurately determine, with reference to information such as the first information, a call status of the UE, and the signal quality parameter of the neighboring cell of the first cell, whether to perform cell handover, so that the UE can camp on a better cell.

In this embodiment of this application, before "UE hands over from the first cell to the second cell" in step 202, the cell handover method provided in this embodiment of this application further includes the following step 301.

Step 301: The UE lowers an access priority of the first cell and adds an identity of the first cell to a blacklist.

In this embodiment of this application, a cell indicated by an identity in the blacklist is a cell that is prohibited from accessing.

It should be noted that, the identity of the cell may be understood as an identity of the cell itself or an identity of a frequency corresponding to the cell.

In this embodiment of this application, when the first information meets the first preset condition, the UE may determine that a network abnormality occurs when the UE uses the data network corresponding to the first cell, and the UE may lower the access priority of the first cell on which the UE currently camps, so that when the UE subsequently accesses a cell, the UE preferentially accesses another cell, so as to avoid preferentially accessing the first cell in which a network abnormality occurs.

In this embodiment of this application, the UE, may set a blacklist reported by A3 event measurement (or a blacklist reported by A4 event measurement or a blacklist reported by A5 event measurement), so as to add the identity of the first cell to the blacklist, thereby avoiding handing over the UE from another cell to the first cell when the network triggers cell handover.

This embodiment of this application provides a cell handover method, when the UE uses the data network corresponding to the first cell, the UE can obtain the first information (that is, the information about the target data packet, the network-related information corresponding to the at least one application, the target uplink resource, the data accumulation amount at the data link layer, and/or the channel quality parameter of the first cell) to determine, according to the first information, whether the network is abnormal when the UE uses the data network corresponding to the first cell, and when determining that the network is abnormal, the UE can hand over from the first cell to the cell whose signal quality parameter meets the second preset condition, or the cell with the highest access priority. That is, as long as the UE detects that a network abnormality, occurs in a network corresponding to a currently camped cell, cell handover is performed, that is, the cell on which the UE finally camps can enable the UE to use a data network corresponding to the cell without a network abnormality, that is, the UE can normally use the data network corresponding to the cell to perform a network service, so that the problem that network interruption occurs when the UE performs a network service can be avoided, and continuity of the network service is improved.

In this embodiment of this application, with reference to step 301, after step 202, the cell handover method provided in this embodiment of this application further includes the following step 401.

Step 401: The UE resumes the access priority of the first cell when a fifth preset condition is met.

In this embodiment of this application, the fifth preset condition includes at least one of the following: The UE leaves a Tracking Area Code (TAC) range, the UE is in an unable-to-register state, and determining whether a target timer times out. The target timer is a timer set at the time of determining whether the first information meets the first preset condition.

It should be noted that, that the UE is in an unable-to-register state may be understood as follows: The LTE is in a non-service state, for example, the UE cannot register with the network due to poor signal quality (e.g., signal quality is less than or equal to a threshold).

In this embodiment of this application, the reason why the UE is in an unable-to-register state includes at least one of the following: an RRC connection failure, a UE authentication failure, poor network signal quality, device abnormality on a UE side/network side, network congestion phenomenon, and denial of access behavior on a network side.

It should be noted that, the timer set at the time of determining whether the first information meets the first preset condition may be understood as follows: When determining whether the first information meets the first preset condition, the LT may set a timer to perform timing, so as to determine whether the first information meets the first preset condition in corresponding duration (for example, the first preset duration and the second preset duration described in the foregoing embodiment) (for example, in the first preset duration, whether a number of uplink data packets is greater than or equal to a first threshold, whether a number of downlink data packets is less than or equal to a second threshold, and whether the uplink data packet includes a TCP data packet).

In this embodiment of this application, when the fifth preset condition is met, the UE may cancel an action of lowering the access priority of the first cell, to resume the access priority of the first cell, so that when subsequently accessing a cell, the UE may access a corresponding cell according to the access priority of the resumed cell, thereby improving flexibility of accessing the cell by the UE.

It should be noted that, the cell handover method provided in this embodiment of this application may be performed by a cell handover apparatus or a control module in the cell handover apparatus configured to perform the cell handover method. In this embodiment of this application, the cell handover apparatus provided in this embodiment of this application is described by using an example in which the cell handover apparatus performs the cell handover method.

Figure 3:
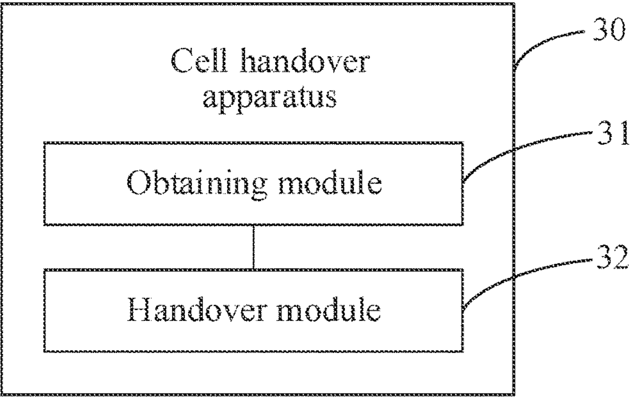
FIG. 3 is a schematic structural diagram of a cell handover apparatus according to an embodiment of this application.

FIG. 3 is a schematic structural diagram of a cell handover apparatus according to an embodiment of this application. As shown in FIG. 3, the cell handover apparatus 30 may include: an obtaining module 31 and a handover module 32; where the obtaining module 31 is configured to: when UE camps on a first cell, obtain first information, where the first information is used to indicate an abnormal situation when the LTE uses a data network corresponding to the first cell; and the handover module 32 is configured to: when the first information meets a first preset condition, hand over from the first cell to a second cell, where the second cell is a cell whose signal quality parameter meets a second preset condition, or the second cell is a cell with the highest access priority; where the first information includes at least one of the following: information about a target data packet, network-related information corresponding to at least one application, a target uplink resource, a data accumulation amount at a data link layer, and a channel quality parameter of the first cell.

In an implementation, the target data packet includes at least one of the following: an uplink data packet and a downlink data packet; and the information about the target data packet includes at least one of the following: a number of target data packets and type information of a data packet in the target data packet. The network-related information includes at least one of the following: domain name resolution information, TCP handshake information, and a network rate, where the domain name resolution information is used to indicate a domain name resolution situation of the at least one application, the TCP handshake information is used to indicate a TCP handshake situation of the at least one application, and the network rate is a maximum network rate corresponding to the at least one application. The channel quality parameter includes at least one of the following: a first ratio, a second ratio, a third ratio, and a number of RBs scheduled by a PUSCH, where the first ratio is a proportion of NACK information on a PHICH, the second ratio is a retransmission rate of uplink data, and the third ratio is a proportion of NACK information on a PDSCH.

In an implementation, the first preset condition includes at least one of the following:

- within first preset duration, a number of uplink data packets is greater than or equal to a first threshold, a number of downlink data packets is less than or equal to a second threshold, and the uplink data packet includes a TCP data packet;
- within second preset duration, multiple applications in the at least one application have a domain name resolution timeout or a TCP handshake timeout, and a maximum network rate corresponding to the multiple applications is less than or equal to a third threshold;
- within third preset duration, the target uplink resource is less than or equal to a fourth threshold, and the data accumulation amount is greater than or equal to a fifth threshold; and
- within fourth preset duration, the channel quality parameter of the first cell meets a third preset condition.

In an implementation, the handover module 32 is specifically configured to: when the UE is in a non-call state, obtain a signal quality parameter of a neighboring cell of the first cell; and when the signal quality parameter of the neighboring cell meets a fourth preset condition, hand over from the first cell to the second cell.

In an implementation, the cell handover apparatus 30 provided in this embodiment of this application further includes: an adjustment module and an addition module; where the adjustment module is configured to lower an access priority of the first cell before the handover module 32 hands over from the first cell to the second cell; and the addition module is configured to add an identity of the first cell to a blacklist, where a cell indicated by an identity of the blacklist is a cell that is prohibited from accessing.

In an implementation, the cell handover apparatus 30 provided in this embodiment of this application further includes: a resume module; where the resume module is configured to: after the handover module 32 hands over from the first cell to the second cell, resume the access priority of the first cell when a fifth preset condition is met; where the fifth preset condition includes at least one of the following: the UE leaves a TAC range, the UE is in an unable-to-register state, and determining whether a target timer expires, where the target timer is a tinier set at the time of determining whether the first information meets the first preset condition.

This embodiment of this application provides a cell handover apparatus, when the apparatus uses the data network corresponding to the first cell, the apparatus can obtain the first information (that is, the information about the target data packet, the network-related information corresponding to the at least one application, the target uplink resource, the data accumulation amount at the data link layer, and/or the channel quality parameter of the first cell) to determine, according to the first information, whether the network is abnormal when the apparatus uses the data network corresponding to the first cell, and when determining that the network is abnormal, the apparatus can hand over from the first cell to the cell whose signal quality parameter meets the second preset condition, or the cell with the highest access priority. That is, as long as the apparatus detects that a network abnormality occurs in a network corresponding to a currently camped cell, cell handover is performed, that is, the cell on which the apparatus finally camps can enable the apparatus to use a data network corresponding to the cell without a network abnormality, that is, the apparatus can normally use the data network corresponding to the cell to perform a network service, so that the problem that network interruption occurs when the apparatus performs a network service can be avoided, and continuity of the network service is improved.

The cell handover apparatus in this embodiment of this application may be an apparatus, or may be a component, an integrated circuit, or a chip in a terminal. The apparatus may be a mobile electronic device or may be a non-mobile electronic device. For example, the mobile electronic device may be a mobile phone, a tablet computer, a notebook computer, a palm computer, an in-vehicle electronic device, a wearable device, an Ultra-Mobile Personal Computer (UMPC), a netbook, or a Personal Digital Assistant (PDA). The non-mobile electronic device may be a server, a Network Attached Storage (NAS), a personal computer, a television, a teller machine, or an automated machine. This is not specifically limited to this embodiment of this application.

The cell handover apparatus in this embodiment of this application may be an apparatus with an operating system. The operating system may be an Android operating system, may be an iOS operating system, or may be another possible operating system. This is not specifically limited to this embodiment of this application.

The cell handover apparatus provided in this embodiment of this application can implement each process implemented in the foregoing method embodiments, and can achieve a same technical effect. To avoid repetition, details are not described herein again.

Figure 4:
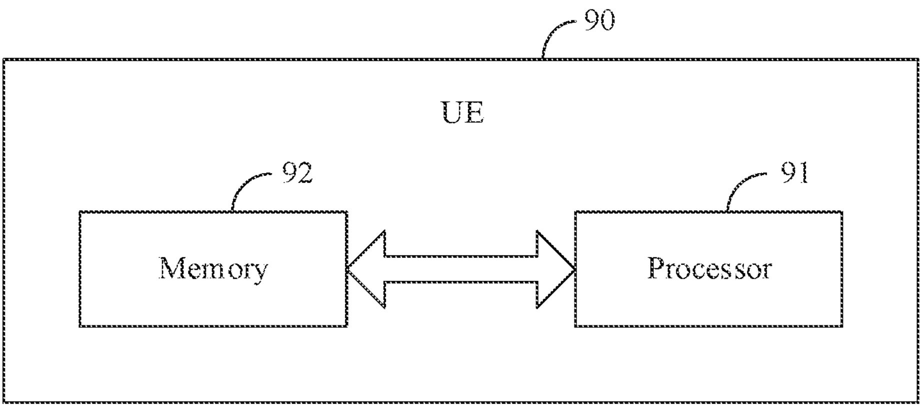
FIG. 4 is a schematic diagram 1 of a hardware structure of UE according to an embodiment of this application.

As shown in FIG. 4, an embodiment of this application further provides UE 90, including a processor 91, a memory 92, and a program or instructions stored in the memory 92 and capable of running on the processor 91. When the program or the instructions is or are executed by the processor 91, various processes in the foregoing method embodiments are implemented, and a same technical effect can be achieved. To avoid repetition, details are not described herein again.

It should be noted that, the UE in this embodiment of this application includes the foregoing mobile electronic device and non-mobile electronic device.

Figure 5:
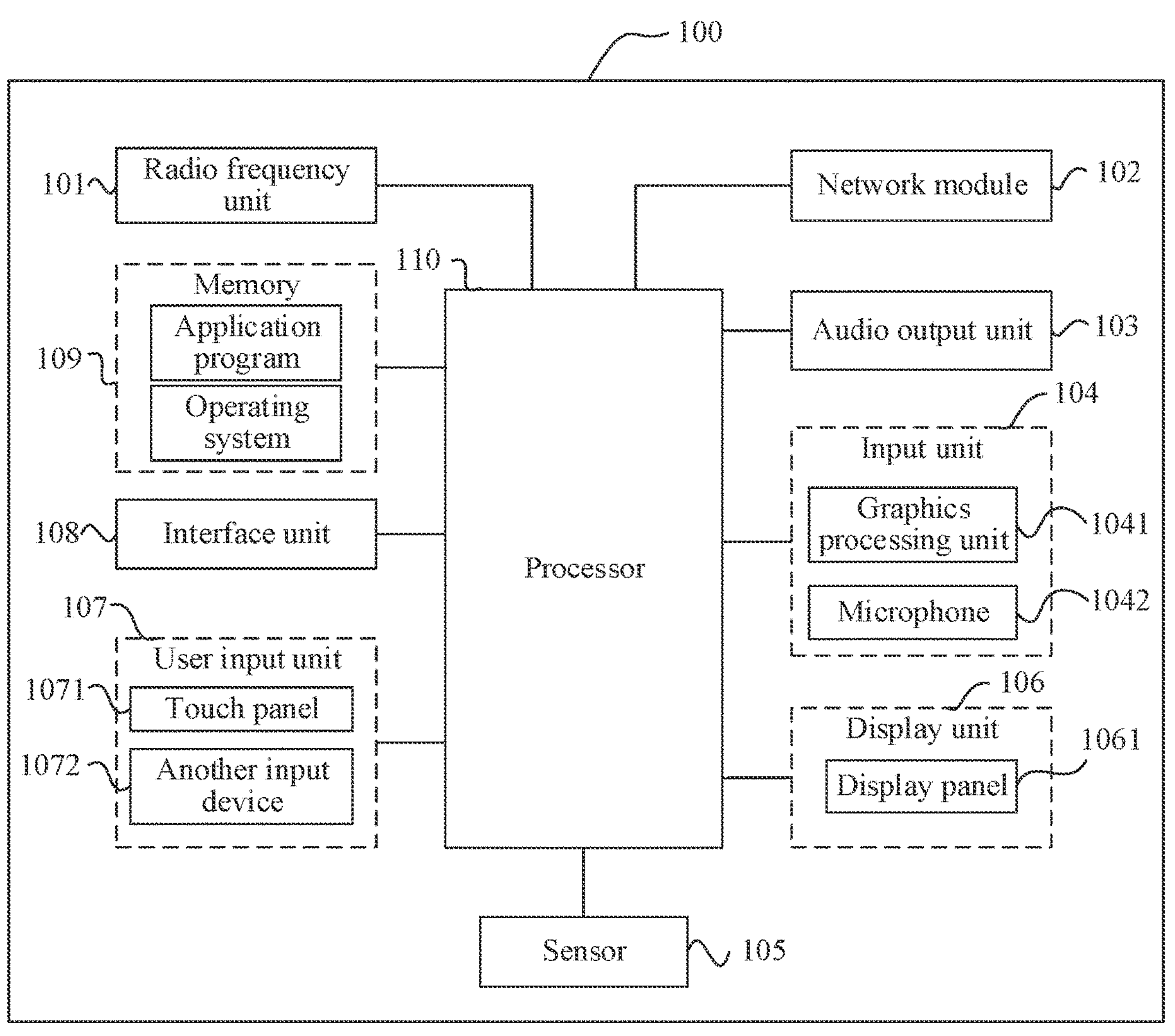
FIG. 5 is a schematic diagram 2 of a hardware structure of UE according to an embodiment of this application.

FIG. 5 is a schematic diagram of a hardware structure of UE according to an embodiment of this application.

The UE 100 includes but is not limited to: a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the UE 100 may further include a power supply (for example, a battery) that supplies power to each component. The power supply may be logically connected to the processor 110 by using a power management system, so as to manage functions such as charging, discharging, and power consumption by using the power management system. The UE structure shown in FIG. 5 constitutes no limitation on the UE; and the UE may include more or fewer components than those shown in the figure, or combine some components, or have different component arrangements.

The processor 110 is configured to: when UE camps on a first cell, obtain first information, where the first information is used to indicate an abnormal situation when the UE uses a data network corresponding to the first cell; and when the first information meets a first preset condition; hand over from the first cell to a second cell, where the second cell is a cell whose signal quality parameter meets a second preset condition, or the second cell is a cell with the highest access priority; where the first information includes at least one of the following: information about a target data packet, network-related information corresponding to at least one application, a target uplink resource, a data accumulation amount at a data link layer, and a channel quality parameter of the first cell.

This embodiment of this application provides UE, when the UE uses the data network corresponding to the first cell, the UE can obtain the first information (that is, the information about the target data packet, the network-related information corresponding to the at least one application, the target uplink resource, the data accumulation amount at the data link layer, and/or the channel quality parameter of the first cell) to determine, according to the first information, whether the network is abnormal when the UE uses the data network corresponding to the first cell, and when determining that the network is abnormal, the UE can hand over from the first cell to the cell whose signal quality parameter meets the second preset condition, or the cell with the highest access priority. That is, as long as the UE detects that a network abnormality occurs in a network corresponding to a currently camped cell, cell handover is performed, that is, the cell on which the UE finally camps can enable the UE to use a data network corresponding to the cell without a network abnormality, that is, the UE can normally use the data network corresponding to the cell to perform a network service, so that the problem that net-work interruption occurs when the UE performs a network service can be avoided, and continuity of the network service is improved.

In this embodiment of this application, the processor 110 is configured to: when the LTE is in a non-call state, obtain a signal quality parameter of a neighboring cell of the first cell; and when the signal quality parameter of the neighboring cell meets a fourth preset condition, hand over from the first cell to the second cell.

In this embodiment of this application; the processor 110 is further configured to lower an access priority of the first cell before handing from the first cell to the second cell; and add an identity of the first cell to a blacklist, where a cell indicated by an identity of the blacklist is a cell that is prohibited from accessing.

In this embodiment of this application, the processor 110 is further configured to: after handing over from the first cell to the second cell, resume the access priority of the first cell when a fifth preset condition is met; where the fifth preset condition includes at least one of the following: the UE leaves a TAC range, the UE is in an unable-to-register state; and determining whether a target timer expires, where the target timer is a timer set at the time of determining whether the first information meets the first preset condition.

The UE provided in this embodiment of this application can implement each process implemented in the foregoing method embodiments, and can achieve a same technical effect. To avoid repetition, details are not described herein again.

It should be understood that, in this embodiment of this application, the input unit 104 may include a Graphics Processing Unit (GPU) 1041 and a microphone 1042. The graphics processing unit 1041 processes image data of a still picture or a video obtained by an image capture apparatus (such as a camera) in a video capture mode or an image capture mode. The display unit 106 may include a display panel 1061. The display panel 1061 may be configured in a form such as a liquid crystal display or an organic light-emitting diode. The user input unit 107 may include a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a function key (such as a volume control key or an on/off key), a trackball, a mouse, and a joystick. Details are not described herein. The memory 109 may be configured to store a software program and various data, including but not limited to an application program and an operating system. The processor 110 may integrate an application processor and a modem processor, where the application processor mainly processes an operating system, a user interface, an application program, and the like, and the modem processor mainly processes wireless communication. It may be understood that the modem processor may not be integrated into the processor 110.

An embodiment of this application further provides a readable storage medium. The readable storage medium stores a program or instructions. When the program or the instructions is or are executed by a processor, various processes in the foregoing method embodiments are implemented, and a same technical effect can be achieved. To avoid repetition, details are not described herein again.

The processor is a processor in the UE in the foregoing embodiment. The readable storage medium includes a computer-readable storage medium such as a Read-Only Memory (ROM), a Random Access Memory (RAM), a magnetic disk, or an optical disc.

An embodiment of this application further provides a chip. The chip includes a processor and a communication interface. The communication interface is coupled to the processor. The processor is configured to run a program or instructions to implement various processes in the foregoing method embodiments, and a same technical effect can be achieved. To avoid repetition, details are not described herein again.

It should be understood that the chip mentioned in this embodiment of this application may also be referred to as a system-level chip, a system chip, a chip system, or a system on chip.

It should be noted that, the terms "include," "comprise," or any other variation thereof in this specification are intended to cover a non-exclusive inclusion, so that a process, method, article, or apparatus that includes a list of elements includes the elements, and also includes other elements that are not expressly listed, or further includes elements inherent to such a process, method, article, or apparatus. Without more limitations, elements defined by the sentence "including one" does not exclude that there are still other same elements in the processes, methods, objects, or apparatuses that include the elements. In addition, it should be noted that the scope of the method and apparatus in the embodiments of this application is not limited to performing a function in a sequence shown or discussed, and may further include performing a function in a basically simultaneous manner or in a reverse sequence based on a related function. For example, the described method may be performed in an order from the described order, and various steps may be added, omitted, or combined. In addition, features described with reference to some examples may be combined in other examples.

Based on the descriptions in the foregoing implementations, a person skilled in the art may clearly learn that the method in the foregoing embodiment may be implemented by software in addition to a necessary universal hardware platform or by hardware only. Based on such an understanding, the technical solutions of this application essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific implementations. The foregoing specific implementations are merely examples, and are not restrictive. Under the enlightenment of this application, many forms may be further made by a person of ordinary skill in the art without departing from the objective of this application and the protection scope of the claims and shall fall within the protection scope of this application.

What is claimed is:

1. A cell handover method, comprising:

when User Equipment (UE) camps on a first cell, obtaining first information, wherein the first information is used to indicate an abnormal situation when the UE uses a data network corresponding to the first cell; and when the first information meets a first preset condition, handing over from the first cell to a second cell, wherein the second cell is a cell whose signal quality parameter meets a second preset condition, or the second cell is a cell with the highest access priority, wherein the first information comprises at least one of the following:

information about a target data packet, network-related information corresponding to at least one application, a target uplink resource, a data accumulation amount at a data link layer, or a channel quality parameter of the first cell, and wherein before handing over from the first cell to the second cell, the method further comprises:

lowering an access priority of the first cell, and adding an identity of the first cell to a blacklist, wherein a cell indicated by an identity of the blacklist is a cell that is prohibited from accessing.

2. The method according to claim 1, wherein the first preset condition comprises at least one of the following:

within first preset duration, a number of uplink data packets is greater than or equal to a first threshold, a number of downlink data packets is less than or equal to a second threshold, and the uplink data packet comprises a TCP data packet;

within second preset duration, multiple applications in the at least one application have a domain name resolution timeout or a TCP handshake timeout, and a maximum network rate corresponding to the multiple applications is less than or equal to a third threshold;

within third preset duration, the target uplink resource is less than or equal to a fourth threshold, and the data accumulation amount is greater than or equal to a fifth threshold; or within fourth preset duration, the channel quality parameter of the first cell meets a third preset condition.

3. The method according to claim 1, wherein the handing over from the first cell to a second cell comprises:

when the UE is in a non-call state, obtaining a signal quality parameter of a neighboring cell of the first cell; and when the signal quality parameter of the neighboring cell meets a fourth preset condition, handing over from the first cell to the second cell.

4. The method according to claim 1, wherein after the handing over from the first cell to a second cell, the method further comprises:

resuming the access priority of the first cell when a fifth preset condition is met, wherein the fifth preset condition comprises at least one of the following:

the UE leaves a Tracking Area Code (TAC) range, the UE is in an unable-to-register state, or determining whether a target timer expires, wherein the target timer is a timer set at the time of determining whether the first information meets the first preset condition.

5. The method according to claim 1, wherein:

the target data packet comprises at least one of the following: an uplink data packet or a downlink data packet;

the information about the target data packet comprises at least one of the following: a number of target data packets or type information of a data packet in the target data packet;

the network-related information comprises at least one of the following: domain name resolution information, Transmission Control Protocol (TCP) handshake information, or a network rate;

the domain name resolution information is used to indicate a domain name resolution situation of the at least one application;

the TCP handshake information is used to indicate a TCP handshake situation of the at least one application;

the network rate is a maximum network rate corresponding to the at least one application;

the channel quality parameter comprises at least one of the following: a first ratio, a second ratio, a third ratio, or a number of Resource Blocks (RBs) scheduled by a Physical Uplink Shared CHannel (PUSCH);

the first ratio is a proportion of Negative ACKnowledgment (NACK) information on a Physical Hybrid automatic repeat request Indicator CHannel (PHICH), and the second ratio is a retransmission rate of uplink data; and the third ratio is a proportion of NACK information on a Physical Downlink Shared CHannel (PDSCH).

6. User equipment (UE), comprising:

a memory storing computer-readable instructions; and a processor coupled to the memory and configured to execute the computer-readable instructions, wherein the computer-readable instructions, when executed by the processor, cause the processor to perform operations comprising:

when the UE camps on a first cell, obtaining first information, wherein the first information is used to indicate an abnormal situation when the UE uses a data network corresponding to the first cell; and when the first information meets a first preset condition, handing over from the first cell to a second cell, wherein the second cell is a cell whose signal quality parameter meets a second preset condition, or the second cell is a cell with the highest access priority, wherein the first information comprises at least one of the following:

information about a target data packet, network-related information corresponding to at least one application, a target uplink resource, a data accumulation amount at a data link layer, or a channel quality parameter of the first cell, and wherein before handing over from the first cell to the second cell, the operations further comprise:

lowering an access priority of the first cell, and adding an identity of the first cell to a blacklist, wherein a cell indicated by an identity of the blacklist is a cell that is prohibited from accessing.

7. The UE according to claim 6, wherein the first preset condition comprises at least one of the following:

within first preset duration, a number of uplink data packets is greater than or equal to a first threshold, a number of downlink data packets is less than or equal to a second threshold, and the uplink data packet comprises a TCP data packet;

within second preset duration, multiple applications in the at least one application have a domain name resolution timeout or a TCP handshake timeout, and a maximum network rate corresponding to the multiple applications is less than or equal to a third threshold;

within third preset duration, the target uplink resource is less than or equal to a fourth threshold, and the data accumulation amount is greater than or equal to a fifth threshold; or within fourth preset duration, the channel quality parameter of the first cell meets a third preset condition.

8. The UE according to claim 6, wherein the handing over from the first cell to a second cell comprises:

when the UE is in a non-call state, obtaining a signal quality parameter of a neighboring cell of the first cell; and when the signal quality parameter of the neighboring cell meets a fourth preset condition, handing over from the first cell to the second cell.

9. The UE according to claim 6, wherein after the handing over from the first cell to a second cell, the operations further comprise:

resuming the access priority of the first cell when a fifth preset condition is met, wherein the fifth preset condition comprises at least one of the following:

the UE leaves a Tracking Area Code (TAC) range, the UE is in an unable-to-register state, or determining whether a target timer expires, wherein the target timer is a timer set at the time of determining whether the first information meets the first preset condition.

10. The UE according to claim 6, wherein:

the target data packet comprises at least one of the following: an uplink data packet or a downlink data packet;

the information about the target data packet comprises at least one of the following: a number of target data packets or type information of a data packet in the target data packet;

the network-related information comprises at least one of the following: domain name resolution information, Transmission Control Protocol (TCP) handshake information, or a network rate;

the domain name resolution information is used to indicate a domain name resolution situation of the at least one application;

the TCP handshake information is used to indicate a TCP handshake situation of the at least one application;

the network rate is a maximum network rate corresponding to the at least one application;

the channel quality parameter comprises at least one of the following: a first ratio, a second ratio, a third ratio, or a number of Resource Blocks (RBs) scheduled by a Physical Uplink Shared CHannel (PUSCH);

the first ratio is a proportion of Negative ACKnowledgment (NACK) information on a Physical Hybrid automatic repeat request Indicator CHannel (PHICH), and the second ratio is a retransmission rate of uplink data; and the third ratio is a proportion of NACK information on a Physical Downlink Shared CHannel (PDSCH).

11. A non-transitory computer-readable medium storing instructions that, when executed by a processor, cause the processor to perform operations comprising:

when the UE camps on a first cell, obtaining first information, wherein the first information is used to indicate an abnormal situation when the UE uses a data network corresponding to the first cell; and when the first information meets a first preset condition, handing over from the first cell to a second cell, wherein the second cell is a cell whose signal quality parameter meets a second preset condition, or the second cell is a cell with the highest access priority, wherein the first information comprises at least one of the following: information about a target data packet, network-related information corresponding to at least one application, a target uplink resource, a data accumulation amount at a data link layer, or a channel quality parameter of the first cell, and wherein before handing over from the first cell to the second cell, the operations further comprise:

lowering an access priority of the first cell, and adding an identity of the first cell to a blacklist, wherein a cell indicated by an identity of the blacklist is a cell that is prohibited from accessing.

12. The non-transitory computer-readable medium according to claim 11, wherein the first preset condition comprises at least one of the following:

within first preset duration, a number of uplink data packets is greater than or equal to a first threshold, a number of downlink data packets is less than or equal to a second threshold, and the uplink data packet comprises a TCP data packet;

within second preset duration, multiple applications in the at least one application have a domain name resolution timeout or a TCP handshake timeout, and a maximum network rate corresponding to the multiple applications is less than or equal to a third threshold;

within third preset duration, the target uplink resource is less than or equal to a fourth threshold, and the data accumulation amount is greater than or equal to a fifth threshold; or within fourth preset duration, the channel quality parameter of the first cell meets a third preset condition.

13. The non-transitory computer-readable medium according to claim 11, wherein the handing over from the first cell to a second cell comprises:

when the UE is in a non-call state, obtaining a signal quality parameter of a neighboring cell of the first cell; and when the signal quality parameter of the neighboring cell meets a fourth preset condition, handing over from the first cell to the second cell.

14. The non-transitory computer-readable medium according to claim 11, wherein after the handing over from the first cell to a second cell, the operations further comprise:

resuming the access priority of the first cell when a fifth preset condition is met, wherein the fifth preset condition comprises at least one of the following:

the UE leaves a Tracking Area Code (TAC) range, the UE is in an unable-to-register state, or determining whether a target timer expires, wherein the target timer is a timer set at the time of determining whether the first information meets the first preset condition.

15. The non-transitory computer-readable medium according to claim 11, wherein:

the target data packet comprises at least one of the following: an uplink data packet or a downlink data packet;

the information about the target data packet comprises at least one of the following: a number of target data packets or type information of a data packet in the target data packet;

the network-related information comprises at least one of the following: domain name resolution information, Transmission Control Protocol (TCP) handshake information, or a network rate;

the domain name resolution information is used to indicate a domain name resolution situation of the at least one application;

the TCP handshake information is used to indicate a TCP handshake situation of the at least one application;

the network rate is a maximum network rate corresponding to the at least one application;

the channel quality parameter comprises at least one of the following: a first ratio, a second ratio, a third ratio, or a number of Resource Blocks (RBs) scheduled by a Physical Uplink Shared CHannel (PUSCH);

the first ratio is a proportion of Negative ACKnowledgment (NACK) information on a Physical Hybrid automatic repeat request Indicator CHannel (PHICH), and the second ratio is a retransmission rate of uplink data; and the third ratio is a proportion of NACK information on a Physical Downlink Shared CHannel (PDSCH).

* * * * *